United States Patent [19]
Caron

[11] Patent Number: 5,299,447
[45] Date of Patent: Apr. 5, 1994

[54] AIR FLOW MANIFOLD SYSTEM FOR PROVIDING TWO DIFFERENT MASS AIR FLOW RATES TO A MASS AIR FLOW SENSOR PRODUCTION CALIBRATION STATION

[75] Inventor: Richard W. Caron, Canton, Mich.

[73] Assignee: Ford Motor Company, Dearborn, Mich.

[21] Appl. No.: 912,940

[22] Filed: Jul. 13, 1992

[51] Int. Cl.⁵ .............................................. G01F 25/00
[52] U.S. Cl. ......................................................... 73/3
[58] Field of Search .................... 73/3; 198/345.1, 346, 198/340, 339.1; 29/593, 595

[56] References Cited

U.S. PATENT DOCUMENTS

| | | | |
|---|---|---|---|
| 2,755,663 | 7/1956 | Smith et al. | 73/116 |
| 3,026,706 | 3/1962 | Halsell et al. | 73/3 |
| 3,226,973 | 1/1966 | Evans et al. | 73/3 |
| 3,469,442 | 9/1969 | Brueckner | 73/118 |
| 4,590,790 | 5/1986 | Hicks et al. | 73/3 |
| 4,879,662 | 11/1989 | Vicari et al. | 73/3 |
| 5,211,056 | 5/1993 | Takamoto et al. | 73/118.2 |

*Primary Examiner*—Robert Raevis
*Attorney, Agent, or Firm*—Roger L. May; Peter Abolins

[57] ABSTRACT

An air flow manifold system for a production line calibration station. The air flow manifold system has a connector manifold connected to the production line calibration station, a vacuum source, a first manifold and a second manifold. The first and second manifolds connect the connector manifold to a vacuum source. The first and second manifolds each have a shut-off valve and a sonic nozzle controlling the mass air flow therethrough. The mass air flow through the first and second sonic nozzles are selected to have an optimal value for the calibrations to be conducted by the calibration station. An electrical controller sequentially activates the first and second valves sequentially supplying the specified mass air flow rates through the calibration station. Pressure and temperature sensors disposed upstream of the sonic nozzles permit an accurate determination of the mass air flow rates through the sonic nozzles.

13 Claims, 3 Drawing Sheets

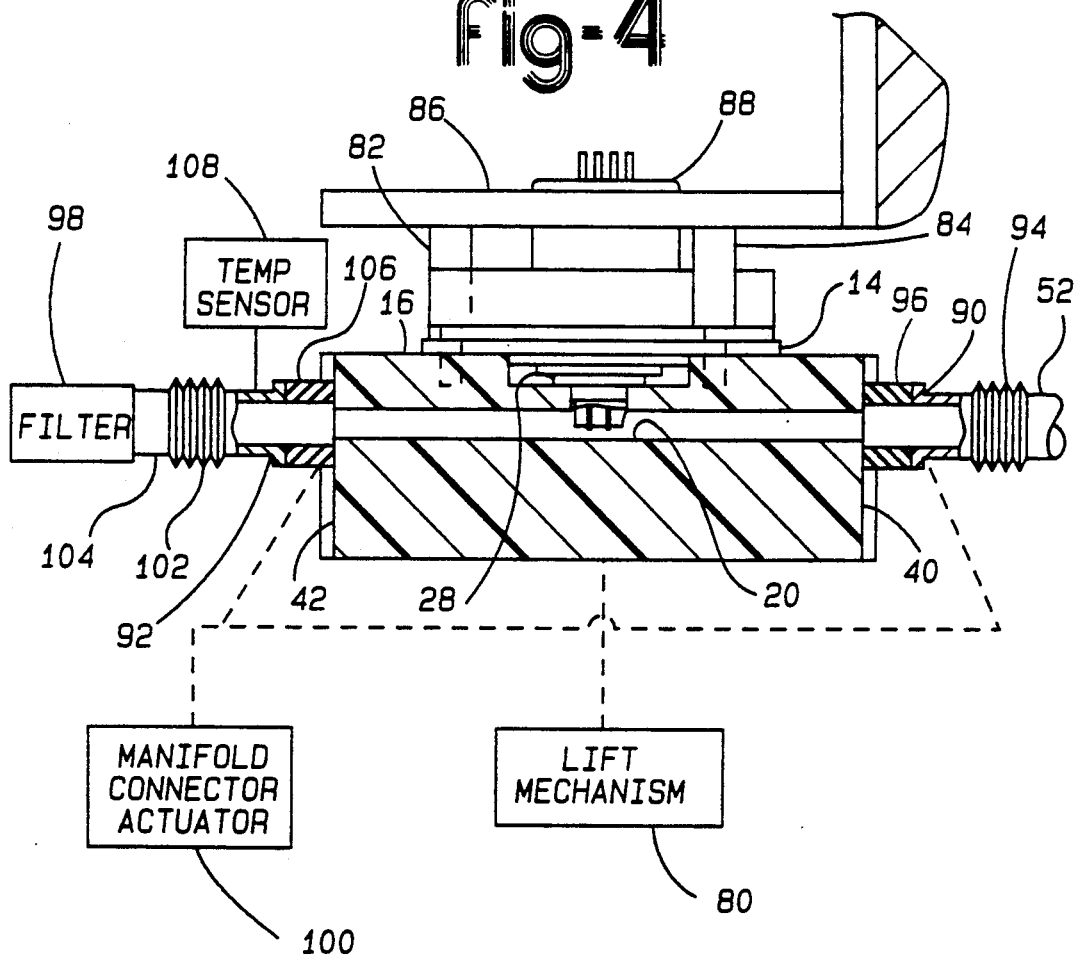

AIR FLOW MANIFOLD SYSTEM FOR PROVIDING TWO DIFFERENT MASS AIR FLOW RATES TO A MASS AIR FLOW SENSOR PRODUCTION CALIBRATION STATION

TECHNICAL FIELD

The invention is related to the field of calibrating mass air flow sensors and in particular to an air flow manifold system which provides two different mass air flow rates to a production calibration station.

BACKGROUND ART

In the production of mass air flow sensors, it is required to adjust the electrical power to the mass air flow sensor's heater so that it will operate at a specified temperature and to adjust the mass air flow sensor's response time to a step change in the mass air flow rate being detected by the mass air flow sensor. Both of these adjustments may be made at the same calibration station if the calibration station can be provided with two different calibrated mass air flow rates. In the use of these mass air flow sensors, the operating characteristic of the manufactured mass air flow sensor must be uniform within specified limits in order to avoid subsequent trimming or adjustments of either the output signal of the mass air flow sensor or the electronic fuel control of an internal combustion engine.

In order to achieve these objectives, the mass air flow calibration must be accurate and repeatable. The use of a critical flow or sonic nozzle to produce a calibrated mass air flow rate is well known in the art. Hicks et al in U.S. Pat. No. 4,590,790 discloses the equation for determining the mass air flow rate through a critical flow or sonic nozzle used to calibrate a volumetric air flow meter on a high pressure pipe line. Evans et al in U.S. Pat. No. 3,226,973 discloses a flowmeter calibration stand using a sonic nozzle to provide a calibrated air flow from a pressurized air source to the flowmeter being calibrated. A pressure regulator is used to maintain the pressure across the sonic nozzle at a fixed value.

The prior art does not recognize the need for production calibration of mass air flow sensors so that their operating parameters are substantially identical, nor the requirement for different calibrated air flow rates for trimming or adjusting different operating parameters of the mass air flow sensors during production.

SUMMARY OF THE INVENTION

A manifold system for providing a first mass air flow rate to a production calibration station for setting the operating temperature of the mass air flow sensor's heating element and for providing a second mass air flow rate to the same production calibration station for setting the response time of the mass air flow sensor in response to a predetermined step change in the mass air flow rate.

One advantage of the manifold system is that the two mass air flow rates provided to the calibration station are repeatable to a high degree of accuracy giving the calibration station excellent test to test repeatability.

Another advantage of the manifold system is that the mass air flow through the sonic nozzles can be accurately determined by measuring the pressure and temperature of the air upstream of the sonic nozzle to compensate for changes in the atmospheric pressure and ambient temperature.

Another advantage of the manifold system is that it operates at low pressures eliminating dangerous conditions in the work place.

The manifold system has a connector manifold connected to the calibration station, a first air flow conduit and a parallel second air flow conduit connecting the connector manifold to a vacuum source. The first air flow conduit includes a first shut-off valve and a first sonic nozzle controlling the mass air flow rate through the calibration station to have a first value when the first valve is opened. The second air flow conduit has a second shut-off valve and a second sonic nozzle controlling the mass air flow rate through the calibration station at a second value different from the first value.

The manifold system further includes an electrical controller responsive to the production line moving a mass air flow sensor into the calibration station for actuating the first and second shut-off valves to produce a first mass air flow rate through the calibration station having the first value and sequentially producing a second mass air flow rate through the calibration station having the second value.

In the preferred embodiment, the first mass air flow rate is selected to have a value predetermined for setting the operating temperature of the mass air flow sensor's heating element and the second mass air flow rate is selected to have a value proving a predetermined step change in the mass air flow rate required for setting the response time of the mass air flow sensor. The preferred embodiment will also include a pressure and a temperature sensor upstream of the first and second sonic nozzle so that the electrical controller in response to the signals generated by the pressure and temperature sensors can accurately determine the mass air flow rate through the calibration station independent of changes in atmospheric pressure and ambient temperature.

The details of the manifold system and other advantages can readily be determined by reading the detailed description of the invention in conjunction with the drawings.

BRIEF DESCRIPTION OF THE DRAWINGS

FIG. 4 is a diagram showing the mechanical features of the calibration station.

BEST MODE FOR CARRYING OUT THE INVENTION

Figure 2:
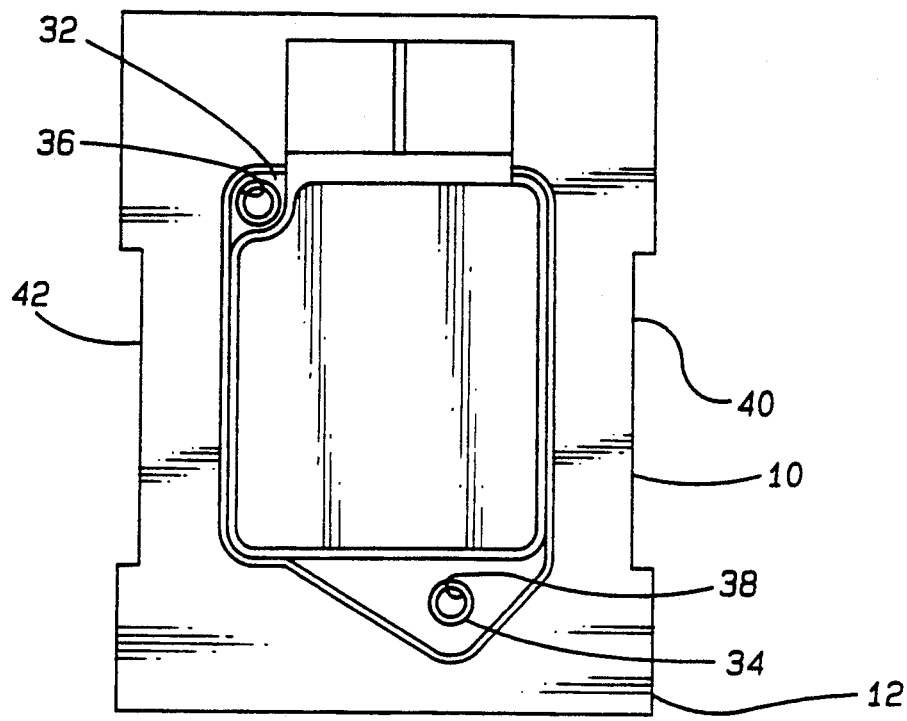
FIG. 2 is a top view of a production carrier carried by the mass air flow sensor production line.
Figure 3:
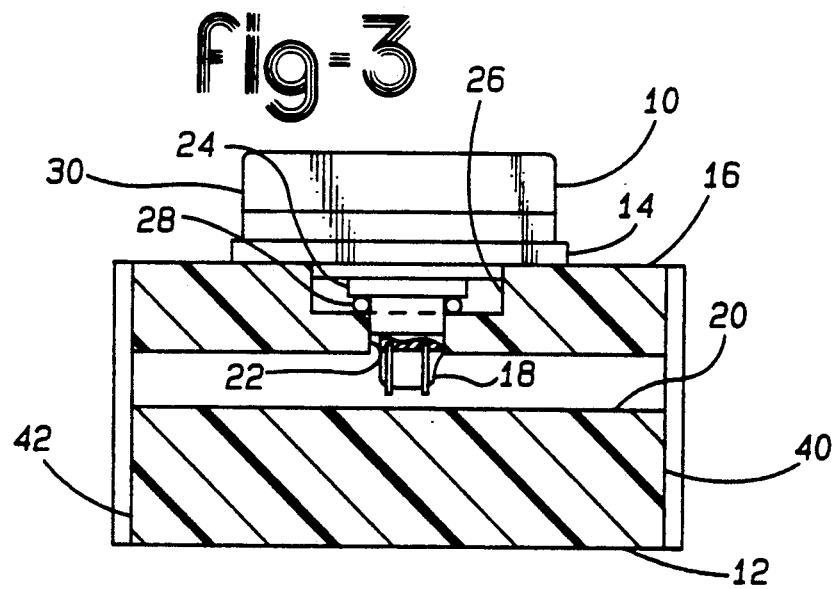
FIG. 3 is a cross-sectional side view of the production carrier and a mass air flow sensor.

Referring first to FIG. 3, the mass air flow sensor 10 is mounted on a production carrier 12 which is carried by a mass production line to various assembly test and calibration stations. The mass air flow sensor 10 has a base plate 14 which rests on the top surface 16 of the carrier 12 as shown in FIG. 3 and a sensing head 18 which extends through a port 22 into an air flow passage 20 provided in the carrier. A collar 24 is provided at the base of the sensing head 18 which is received in a well 26 provided in carrier 12 and an O-ring 28 is provided about the sensing head 18 which provides a seal about port 22 between the collar 24 and the bottom of the well 26. The base plate 14 and the housing 30 which houses the circuit board for the electronic circuitry associated with the mass air flow sensor 10 are precisely located as shown in FIG. 2 on the carrier 12 by a pair of alignment pins 32 and 34 which are received through mounting apertures 36 and 38 provided through the housing 30 and the base plate 14.

The air flow passage 20 extends through the carrier 12 and simulates the air flow passage in which the sensing head 18 of the mass air flow sensor will be mounted in its intended application. A pair of recessed sealing surfaces 40 and 42 are provided at the opposite ends of the air flow passage 20.

Figure 1:
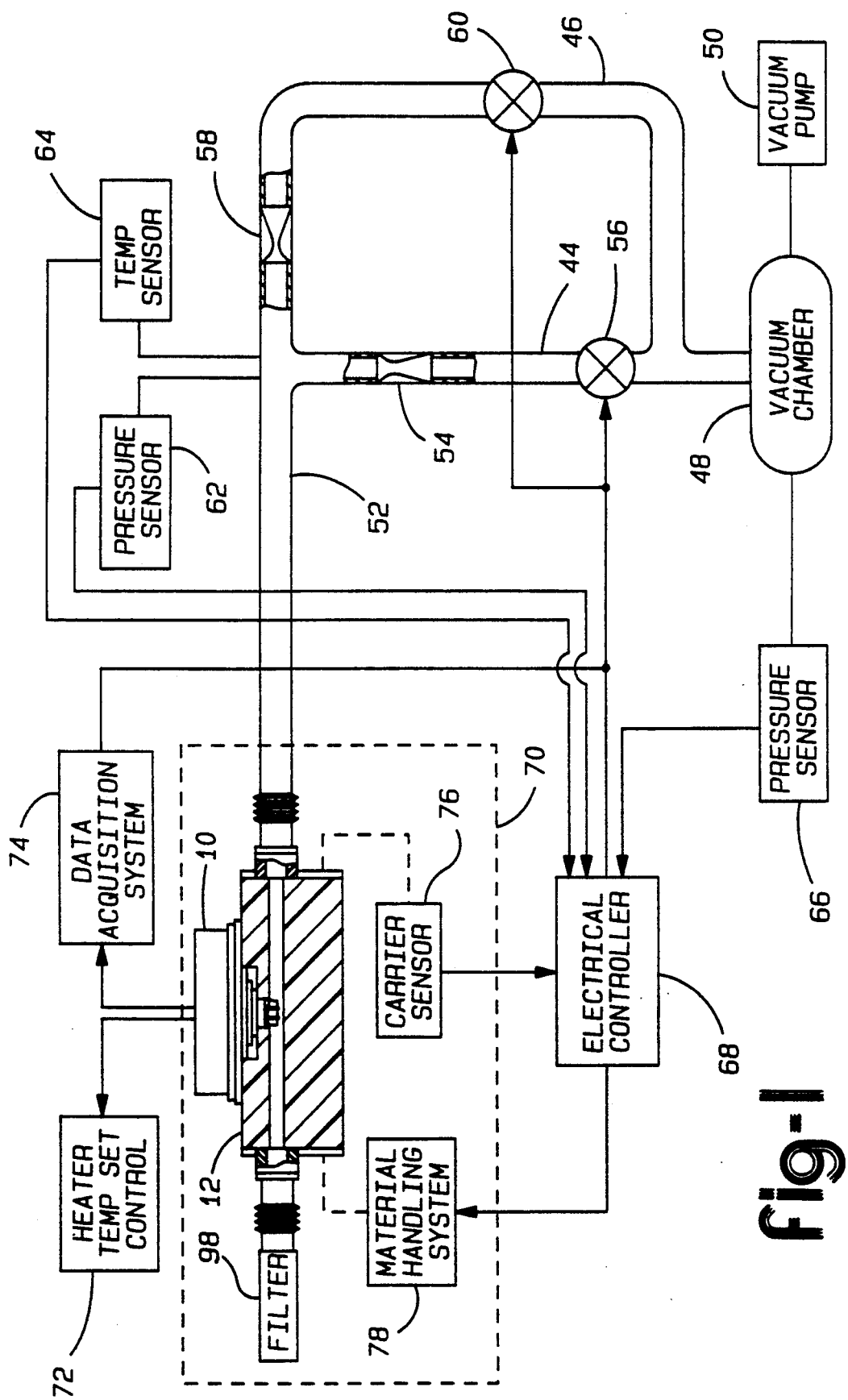
FIG. 1 is a block diagram of the air flow manifold system.

Referring now to FIG. 1, the air flow conduit system has a first air flow conduit 44 and a parallel second air flow conduit 46 connected to a common vacuum chamber 48 which is continuously being evacuated by a vacuum pump 50. The opposite ends of the first air flow conduit 44 and the second air flow conduit 46 are connected to a connector conduit 52. The first air flow conduit 44 has a first sonic nozzle 54 and a first shut-off valve 56. In a similar manner, the second air flow conduit 46 has a second sonic nozzle 58 and a second shut-off valve 60. A first pressure sensor 62 and a first temperature sensor 64 monitor the pressure and the temperature of the air in the connector manifold 52 upstream of the first and second sonic nozzles 54 and 58, respectively. A second pressure sensor 66 monitors the pressure in the vacuum chamber 48. The pressures upstream and downstream of the sonic nozzles 54 and 58 are continuously monitored to assure that the pressure differential across the sonic nozzles 54 and 58 is sufficient to produce a critical air flow therethrough. A control valve (not shown) may also be inserted upstream of the sonic nozzles such that, by controlling how much the valve is opened or closed, it will cause a change in the nozzle's upstream pressure which, in turn, relates to a corresponding change in the mass air flow rate through the nozzle. This valve can, therefore, be used to set precise mass air flow rates for either of the two sonic nozzles.

As is known in the art, the air flow through a sonic nozzle is a constant when operating at a critical air flow giving the air flow through the air flow passage 20 of the carrier 12 excellent test-to-test repeatability. The rate of air flow can be accurately determined from the physical characteristics of the sonic nozzles, the upstream pressure as measured by the pressure sensor 62, and the upstream temperature as measured by the temperature sensor 64 of the air flowing in the connector manifold 52 upstream of the sonic nozzles 54 and 58, as well as air humidity measured by an air humidity sensor (not shown) and barometric pressure measured by a barometric pressure sensor (not shown), each of which would be connected to the electrical controller 68 as are pressure sensor 62 and temperature sensor 64. An electrical controller 68 stores the air flow characteristics of the sonic nozzles 54 and 58 and accurately computes the rate of air flow using the pressure and temperature of the air detected by pressure sensor 62 and temperature sensor 64.

The connector manifold 52 is connected to a calibration station 70. The calibration station 70 will first set the temperature of the sensing head's heating element using the air flow controlled by the first sonic nozzle 54. For this test, the first sonic nozzle is calibrated to produce a mass air flow rate of approximately 0.5 kilograms per hour. In this calibration, the power being applied to the heating element is measured and transmitted to a heater temperature set control system 72 which computes how much a first predetermined resistance in the electronic circuit is to be trimmed so that the temperature of the heating element is approximately 200° C. The heater temperature set control system will activate a laser, not shown, which will then proceed to trim the first predetermined resistance trimming the electrical power being supplied to the heater element so that it will have a 200° C. operating temperature.

After the temperature of the heating wire is set, the electrical controller 68 will close shut-off valve 56 terminating the air flow through sonic nozzle 54 and open shut-off valve 60 producing a critical or sonic air flow through the second sonic nozzle 58. The opening of shut-off valve 60 will trigger a data acquisition system 74 which will monitor the output of the mass air flow sensor 10 in response to the step change in the air flow rate through the air flow passage 20 of the carrier 12 controlled by sonic nozzle 58 with the opening of the shut-off valve 60. The sonic nozzle 58 will control the air flow rate through the air flow passage 20 to be approximately 8.4 kilograms/hour. As is known in the art, critical air flow through a sonic nozzle is achieved almost instantaneously with the application of a required pressure differential. Therefore, a step change in the mass air flow rate through the air flow channel is likewise instantaneous.

The data acquisition system 74 will compute the response time of the mass air flow sensor 10 being tested and will activate the laser trimmer to trim a second predetermined resistance of the mass air flow sensor to set the response time to within specified limits.

A carrier sensor 76 will generate a carrier present signal signifying the conveyance of a carrier 12 by the production line (not shown) into the calibration station 70. The carrier sensor 76 may be a mechanical switch or an electro-optical sensor as is known in the art. The electrical control 68 will respond to the carrier present signal and activate the calibration station's material handling system 78 to lift the carrier 12 with the mass air flow sensor mounted thereon to a calibration position.

As shown more clearly in FIG. 4, the material handling system 78 will include a lift mechanism 80 which lifts the carrier 12 to the calibration position. As the carrier approaches the calibration position, a pair of clamping posts 82 and 84 engage the housing 30 adjacent to the alignment pins 32 and 34 and clamp the housing 30 and the base plate 14 to the top surface 16 of the carrier 12. This clamping action compresses the O-ring 28 between the collar 24 of the mass air flow sensor 10 and the bottom of the well 26 sealing the region circumscribing the port 22.

The clamping posts 82 and 84 are attached to a common base plate 86 which is attached to the frame of the calibration station or other rigid or fixed member. Preferably the clamping posts 82 and 84 are resiliently biased in a vertical direction to prevent deformation of housing 30 or the carrier 12 when being lifted to the calibration position. An electrical connector 88 is also mounted to the base plate 86 and electrically contacts selected test points provided on the circuit board of the mass air flow sensor on which the electronic circuit is mounted. These selected test points provide for the monitoring of the power being provided to the heater in the sensing head and the output signal generated by the mass air flow sensor used by the data acquisition system to determine the sensor's response time.

The calibration station 70 also includes a manifold connector actuator 100 which displaces air flow connectors 90 and 92 into sealing contact with the recessed sealing surfaces 40 and 42 of the carrier 12 in alignment with the air flow passage 20. The air flow connector 90 has one end connected to the connector manifold 52 through a resilient member, such as bellows 94. The bellows 94 allows the displacement of the air flow connector 90 to and from the sealing surface 40 of the carrier 12. The air flow connector 90 has a resilient annular seal 96 which circumscribes the air flow passage 20 when it is sealingly engaged with sealing surface 40.

The air flow connector 92 is connected to an inlet air filter 98 through a bellows 102 and a connector pipe 104. Like bellows 94, bellows 102 permits the displacement of the air flow connector 92 to and from recessed sealing surface 42. Air flow connector 92 also has resilient annular seal member 106 which sealingly engages the recessed sealing surface 42 concentric with the air flow passage 20.

A second temperature sensor 108 connected to the connector pipe 104 which generates a second temperature signal having a value corresponding to the temperature of the air entering the air flow passage 20.

Having described the air flow manifold system relative to the preferred embodiment shown in the drawings, it is not intended that the invention be limited to the specific embodiment shown. It is recognized that persons skilled in the art may make changes or improvements thereto within the scope of the invention set forth in the appended claims.

I claim:
1. An air flow system for sequentially providing a first and a second mass air flow rate to a production calibration station, said production calibration system setting the operating temperature of a heater of a mass air flow sensor mounted in said calibration station during said first mass air flow rate and sequentially setting the response time of said mass air flow sensor during said second mass air flow rate, said air flow system comprising:
   a vacuum source;
   a first air flow conduit connected between said vacuum source and the production calibration station;
   a second air flow conduit connected in parallel with said first air flow conduit between said vacuum source and the prodution calibration station;
   a first shut-off valve connected to said first air flow conduit, said first shut-off valve having an open state permitting an air flow through said first air flow conduit and a closed state inhibiting an air flow through said first air flow conduit;
   a first sonic nozzle for controlling the mass air flow rate through said first air flow conduit when said first shut-off valve is in said open state, said mass air flow rate through said first sonic nozzle selected to have a value predetermined to permit the operating temperature of said heater of said mass air flow sensor to be set;
   a second shut-off valve attached to said second air flow conduit, said second shut-off valve having an open state permitting an air flow through said second air flow conduit and a closed state prohibiting an air flow through said second air flow conduit;
   a second sonic nozzle for controlling the mass air flow rate through said second air flow conduit when said second shut-off valve is in said open state, said second sonic nozzle controlling the mass air flow rate through said second air flow conduit to have a value predetermined to permit the response time of said mass air flow sensor to be set; and
   an electrical control responsive to a signal indicating a mass air flow sensor has entered said calibration station to sequentially activate said first shut-off valve to said open state, said electrical control further responsive to said calibration station completing the setting of the operating temperature of the heater of the mass air flow sensor, to deactivate said first valve and to activate said second shut-off valve, and to generate a signal to the calibration station to measure the response time.

2. The air flow system of claim 1 wherein the mass air flow sensor is mounted on a production carrier and wherein the mass air flow sensor has a sensing head extending into an air flow passage provided through the production carrier, said air flow system further comprising a manifold connecting said first and second air flow conduits to the air flow passage of the production carrier when the production carrier is in the calibration station.

3. The air flow system of claim 1 further comprising:
   a connector manifold having one end connected to the calibration station and a second end connected to the ends of said first and second air flow conduits opposite said vacuum source;
   a first pressure sensor for generating a first pressure signal having a value corresponding to the air pressure in said connector manifold; and
   a temperature sensor for generating a temperature signal having a value corresponding to the temperature of the air in said connector manifold; and
   wherein said electrical control has means for accurately determining the mass air flow through said first and second sonic nozzles in response to said first pressure signal, said temperature signal, and predetermined physical parameters of said first and second sonic nozzles.

4. The air flow system of claim 1 wherein said vacuum source comprises:
   a vacuum chamber; and
   a vacuum pump connected to said vacuum chamber, said vacuum pump maintaining the pressure in said vacuum chamber below a predetermined value.

5. The air flow system of claim 4 further comprising a second pressure sensor connected to said vacuum chamber, said second pressure sensor generating a second pressure signal having a value corresponding to the pressure in said vacuum chamber; and
   wherein said electrical control has means responsive to said first and second pressure signal for generating a signal to said calibration station signifying that the pressure differential across said first and second sonic nozzles is sufficient to cause critical air flow.

6. A manifold system for providing two different mass air flow rates to a production carrier for a mass air flow sensor in a calibration station which sets the operating temperature of a heating element of a mass air flow sensor and the response time of the mass air flow sensor, the production carrier having an air flow passage receiving the sensing head of the mass air flow sensor mounted thereon, said manifold system comprising;
   a connector manifold having one end connectable to the air flow passage of the production carrier when the production carrier is located in the calibration station;

a first air flow conduit connected between said connector manifold and a vacuum source, said first air flow conduit having a first shut-off valve having a closed state and an open state, and a first sonic nozzle for controlling the mass air flow through said first air flow conduit to have a first value when said first shut-off valve is in said open state;

a second air flow conduit connected in parallel with said first air flow conduit between said connector manifold and said vacuum source, said second air flow conduit having a shut-off valve having closed state blocking air flow through said second air flow conduit and an open state, and a second sonic nozzle for controlling the mass air flow through said second air flow conduit to have a second value when said second shut-off valve is in said open state;

an electrical controller responsive to a signal generated by a sensor provided in the calibration station signifying the presence of the production carrier in the calibration station to actuate said first and second valves to sequentially provide a mass air flow rate having said first value and a mass air flow rate having said second value to the air flow passage of the production carrier in the calibration station.

7. The manifold system of claim 6 wherein said first value of said mass air flow rate is selected to have a value specified for the setting of the operating temperature of the heating element of the mass air flow sensor.

8. The manifold system of claim 7 wherein said first value of said mass air flow rate is approximately 0.5 kilograms per hour.

9. The manifold system of claim 7 wherein said second value of said mass air flow rate is selected to have a value specified for setting the response time of said mass air flow sensor.

10. The manifold system of claim 9 wherein said second value of said mass air flow rate is approximately 8.4 kilograms per hour.

11. The manifold system of claim 6 further comprising a first pressure sensor for measuring the pressure of the air in said manifold system upstream of said first and second sonic nozzles and a temperature sensor for measuring the temperature of said air in said manifold system upstream of said first and second sonic nozzles and wherein said electrical controller comprises means for accurately determining said first and second values of said mass air flow rate in response to said temperature and pressure measured by said first pressure sensor and said temperature sensor respectively.

12. The manifold system of claim 11 further comprising a second pressure sensor for measuring the pressure of the air in said manifold system downstream of said first and second sonic nozzles and wherein said electrical control further comprises means for generating a signal to the calibration station signifying that said first and second nozzles are operating under sonic conditions.

13. The manifold system of claim 11 wherein said calibration station has a data acquisition system connected to said mass air flow sensor in said calibration station, said electrical controller activating said data acquisition system to collect the output data generated by the mass air flow sensor in response to activating said second value, the calibration station utilizing the output data collected by the data acquisition system to set the response time of the mass air flow sensor.

* * * * *